(12) United States Patent
Chen et al.

(10) Patent No.: US 12,458,984 B2
(45) Date of Patent: Nov. 4, 2025

(54) APPLICATION OF SELENIUM-CONTAINING ORGANIC COMPOUNDS IN COPPER SULFIDE FLOTATION COLLECTORS

(71) Applicant: Guangxi University, Nanning (CN)

(72) Inventors: Jianhua Chen, Nanning (CN); Anruo Luo, Nanning (CN)

(73) Assignee: Guangxi University, Nanning (CN)

( * ) Notice: Subject to any disclaimer, the term of this patent is extended or adjusted under 35 U.S.C. 154(b) by 332 days.

(21) Appl. No.: 18/107,114

(22) Filed: Feb. 8, 2023

(65) Prior Publication Data
US 2024/0149276 A1    May 9, 2024

(30) Foreign Application Priority Data

Oct. 17, 2022 (CN) .......................... 202211267627.4

(51) Int. Cl.
| | |
|---|---|
| *B03D 1/004* | (2006.01) |
| *B03D 1/006* | (2006.01) |
| *B03D 1/008* | (2006.01) |
| *B03D 1/01* | (2006.01) |
| *B03D 1/012* | (2006.01) |
| *B03D 1/014* | (2006.01) |

(52) U.S. Cl.
CPC ............. *B03D 1/004* (2013.01); *B03D 1/006* (2013.01); *B03D 1/008* (2013.01); *B03D 1/01* (2013.01); *B03D 1/012* (2013.01); *B03D 1/014* (2013.01); *B03D 2201/02* (2013.01); *B03D 2203/02* (2013.01)

(58) Field of Classification Search
CPC ........ B03D 1/004; B03D 1/006; B03D 1/008; B03D 1/01; B03D 1/012; B03D 1/014; B03D 2201/02; B03D 2203/02; B03D 2203/025
See application file for complete search history.

(56) References Cited

U.S. PATENT DOCUMENTS

2017/0165681 A1*  6/2017  De Oliveira Filho . B03D 1/012

OTHER PUBLICATIONS

International Journal of Mineral Processing vol. 143, Oct. 10, 2015, pp. 43-49. (Year: 2015).*
Minerals Engineering vol. 64, Oct. 1, 2014, pp. 38-43. (Year: 2014).*
Russian Journal of Non-Ferrous Metals, 2021, vol. 62, No. 4, pp. 375â381. (Year: 2021).*

* cited by examiner

*Primary Examiner* — Pranav N Patel
(74) *Attorney, Agent, or Firm* — Cooper Legal Group, LLC

(57) ABSTRACT

Disclosed is an application of a class of selenium-containing organic compounds in copper sulfide flotation collectors, including organic compound with selenium atoms as functional groups and containing single selenium atom or multiple selenium atoms, where the organic compound with selenium atoms as functional groups and containing single selenium atom or multiple selenium atoms includes but not limited to selenophene, phenylselenol and diselenide as copper collectors; and a class of organic compound containing selenium atoms combined with nitrogen, oxygen, phosphorus, sulfur and carbon, where the class of organic compound containing selenium atoms combined with nitrogen, oxygen, phosphorus, sulfur and carbon includes but not limited to selenomethyl ester, carbonyl selenomethyl ester, oxycarbonyl selenomethyl ester, selenourea, selenium nitrogen, selenoxanthonic acid, selenoxanthate, selenophosphoric acid, selenium phosphate ester, triphenylphosphine selenide, all kinds of benzoselenediazole molecules as copper collectors.

10 Claims, No Drawings

APPLICATION OF SELENIUM-CONTAINING ORGANIC COMPOUNDS IN COPPER SULFIDE FLOTATION COLLECTORS

CROSS-REFERENCE TO RELATED APPLICATIONS

This present application claims priority to Chinese Patent Application No. 202211267627.4, filed on Oct. 17, 2022, the contents of which are hereby incorporated by reference.

TECHNICAL FIELD

The application relates to the technical field of mineral processing reagents, and in particular to an application of a class of selenium-containing organic compounds in copper sulfide flotation collectors.

BACKGROUND

Flotation reagents are classified into collectors, depressants and foaming agents, among which collectors play a very important role in mineral flotation because their function is to regulate the hydrophobicity of mineral surfaces. It is generally believed that the progress in flotation theory and technology mainly depends on the new structural invention and action principle of the new structure of collectors. For example, an invention of O-isopropyl-N-ethyl thiocarbamate (Z-200) in 1960s improved the flotation selectivity of copper minerals significantly, and the global copper output was greatly increased. However, throughout the 100-year history of flotation reagents, it has become more and more difficult to invent efficient flotation reagents with new structures. Since the late 1920s, thiocarbonate collectors, such as xanthate, aerofloat and sulfur-nitrogen series were invented, the copper flotation ester collector represented by O-isopropyl-N-ethyl thiocarbamate (Z-200) was invented in 1960s, and the sodium di(isobutyl) dithiophosphinate (3418A) which has a selective collecting effect on lead was invented by Cytec Company in 1990s. After entering the 21st century, there are few reports of new flotation collectors with obvious effects. The invention of new flotation reagent structure has entered a bottleneck period, which is mainly caused by the limited ligand atoms in the existing molecular structure of flotation collectors.

Generally, flotation collectors are organic compounds containing hydrophilic groups and hydrophobic groups, among which the hydrophilic groups are the key to determine the molecular selectivity of flotation reagents. For selective collectors, it is generally believed that the progress in flotation theory and technology mainly depends on the new structural invention and the design of action principle of the new structure of selective collectors mainly focuses on the hydrophilic groups. At present, all the atoms constituting the functional groups of flotation organic compounds are mainly ligand atoms of nitrogen (N), oxygen (O), phosphorus (P), and sulfur(S). Arsenic atoms were used as functional groups, such as benzyl arsenic acid, but this kind of structure is no longer used due to toxicity. At present, all flotation reagents are designed and combined with four ligand atoms of N, O, P and S, such as collector functional groups of S.S, O.O, N.N, S.N, O.N and S.O. Phosphorus atoms are generally not used as functional group bonds and atoms, but as constituent atoms in the functional group structure. For example, an aerofloat functional group-POSSH, its bonding agent is sulfur atom, and it is still of S.S type in nature. For another example, a phosphonate functional group —O—PO(OH)2, its bonding atom is an oxygen atom and it is of O.O type in nature. In fact, the atoms with coordination ability in the functional groups of flotation reagents are mainly N, O, S. Since the advent of flotation technology for one hundred years, the functional groups of flotation reagents have been combined and designed in large quantities, but it is found that it is difficult to form a new structure composed of four atoms of N, O, P and S. Therefore, the conventional flotation reagent structure has developed to a bottleneck stage, and it is difficult to make a new breakthrough. The present application provides brand-new copper sulfide flotation collectors with functional group structure with selenium atom as the core, and flotation effect thereof is consistent with that of conventional collectors with N, O, P, S structure and the flotation effect of some selenium-containing collectors even exceeds that of the best oxycarbonyl collectors for copper flotation, such as phenylselenol, dibenzyl diselenide, etc. As the biggest breakthrough of flotation collectors in a hundred years, the copper sulfide flotation collectors provided in the present application develop the conventional four ligand atoms of N, O, P, S of flotation reagents into five ligand atoms of Se, N, O, P, S and provide more new structural design for the flotation reagents.

SUMMARY

The objective of the application is to provide an application of a class of selenium-containing organic compounds in copper sulfide flotation collectors, where the copper sulfide flotation collectors have functional group structure with selenium atoms as the core, flotation effects thereof are consistent with those of conventional collectors with nitrogen (N), oxygen (O), phosphorus (P) and sulfur(S) structures and some selenium-containing collectors even surpass the best oxycarbonyl collectors for copper flotation, such as phenylselenol, dibenzyl diselenide, etc. As the biggest breakthrough of flotation collectors in a hundred years, the copper sulfide flotation collectors develop the conventional four ligand atoms of flotation reagent N, O, P and S into five ligands of selenium (Se), N, O, P and S and provide more new structural designs for flotation reagents.

The technical scheme of the application is as follows: the application of a class of selenium-containing organic compounds in copper sulfide flotation collectors, where the selenium-containing organic compounds include organic compound with selenium atoms as functional groups and containing single selenium atom or multiple selenium atoms, including but not limited to selenophene, phenylselenol and diselenide as copper collectors.

The selenium-containing organic compounds include organic compound containing selenium atoms combined with nitrogen, oxygen, phosphorus, sulfur and carbon, including but not limited to: selenomethyl ester, carbonyl selenomethyl ester, oxycarbonyl selenomethyl ester, selenourea, selenium nitrogen, selenoxanthonic acid, selenoxanthate, selenophosphoric acid, selenium phosphate ester, triphenylphosphine selenide, all kinds of benzoselenediazole molecules as copper collectors.

Optionally, molecular structures of the organic compound with selenium atom as functional groups and containing single selenium atom or multiple selenium atoms as copper ore flotation collectors are as follows:

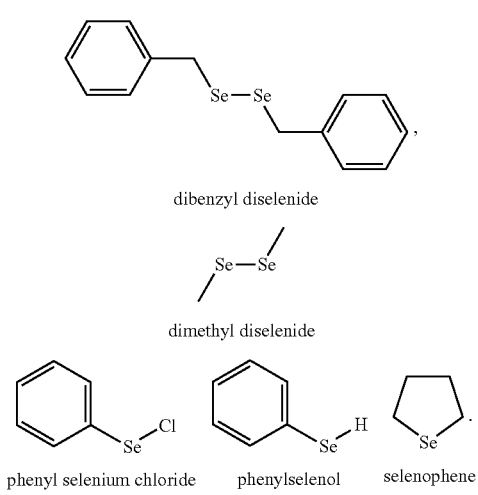

dibenzyl diselenide dimethyl diselenide phenyl selenium chloride    phenylselenol    selenophene Optionally, molecular structures of the organic compound containing selenium atoms combined with nitrogen, oxygen, phosphorus, sulfur and carbon as copper ore flotation collectors are as follows:

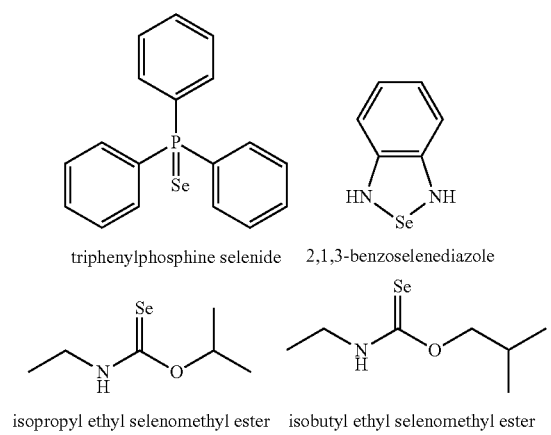

triphenylphosphine selenide    2,1,3-benzoselenediazole isopropyl ethyl selenomethyl ester    isobutyl ethyl selenomethyl ester ethyl isopropyl selenoate formate ethyl isobutyl selenoate formate isoamyl allyl selenoate

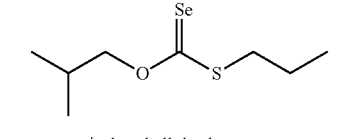

isobutyl allyl selenoate

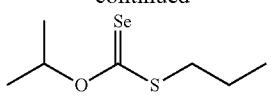

isopropyl allyl selenoate

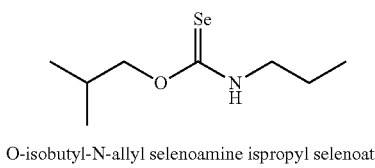

O-isobutyl-N-allyl selenoamine ispropyl selenoate

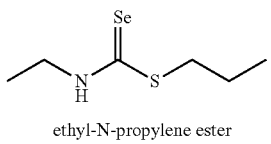

ethyl-N-propylene ester

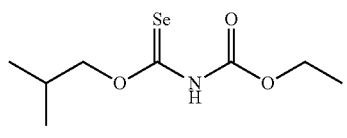

O-isobutyl-N-ethoxycarbonyl selenomethyl ester

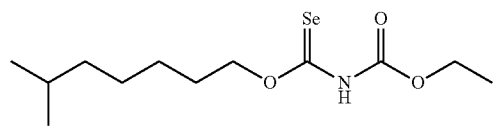

O-isooctyl-N-ethoxycarbonyl selenomethyl ester

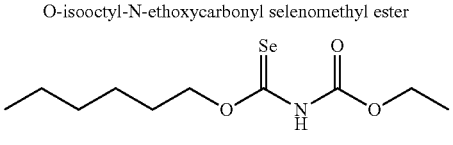

hexoxycarbonyl selenomethyl ester

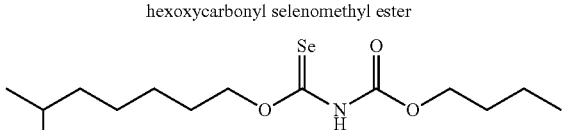

O-isooctyl-N-n-butoxycarbonyl selenomethyl ester

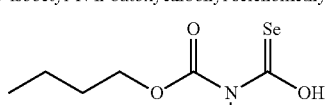

isooctyl-N-n-butoxycarbonyl selenomethyl ester dihydrocarbyl seleno phosphate

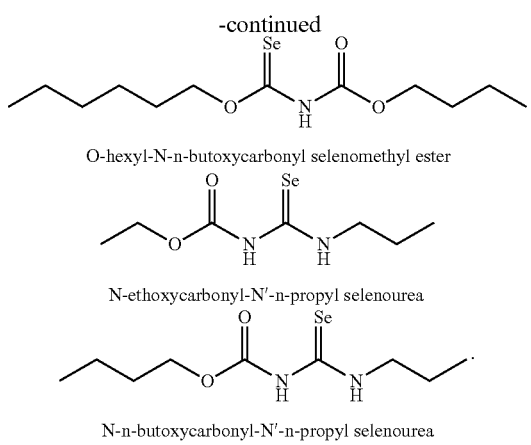

O-hexyl-N-n-butoxycarbonyl selenomethyl ester

N-ethoxycarbonyl-N'-n-propyl selenourea

N-n-butoxycarbonyl-N'-n-propyl selenourea

Principle of Action:

According to a hard-soft-acid-base principle, copper ions in copper sulfide minerals belong to relatively soft acids, and conventional collectors for copper flotation, such as aerofloat, thiocarbamate, oxycarbonyl ester, etc., all belong to relatively soft bases, and these agents have good selectivity for copper sulfide flotation. Selenium atoms, softer than sulfur, rank behind functional groups of aerofloat and sulfur and nitrogen in the ligand spectrum series, which means that ligands of selenium-containing functional groups are stronger than those of the aerofloat, the thiocarbamate, the oxycarbonyl ester and other functional groups. Therefore, selenium atoms-containing collectors are theoretically easier to interact with copper sulfide minerals than conventional copper collectors, and have better selectivity.

In addition, according to a theory of flotation coordination chemistry, when π electron pairs of metal ions on a mineral surface form feedback π bonds with empty π orbitals on collector molecules, the selectivity between the collectors and the mineral surface is the strongest. The quantum calculation results show that the selenium atoms-containing collectors contain the empty π orbitals in the molecular structure, and the empty π orbitals form strong feedback π bonds with copper atoms on surfaces of copper sulfide minerals, so that the selective flotation of copper sulfide minerals is realized.

The application has the outstanding advantages that the flotation effect of the copper sulfide flotation collectors with selenium atom as the core functional group structure is the same as that of the conventional collectors with N, O, P, S structure, and the flotation effect of some selenium-containing collectors even exceeds that of the best oxycarbonyl collectors for copper flotation, such as phenylselenol and dibenzyl diselenide. According to present application, the conventional four ligand atoms of N, O, P and S of flotation collectors are developed into five ligand atoms of Se, N, O, P and S, and a more brand-new structural design are provided for the new structural design of flotation collectors.

DETAILED DESCRIPTION OF THE EMBODIMENTS

The technical scheme of the present application will be further described in detail by the following specific embodiment.

Embodiment 1

This embodiment is an application example of the organic compound with selenium atoms as functional groups and containing single selenium atom, including:

mineral raw materials:

in a large porphyry copper mine in Tibet, contents of target elements Cu (copper), Au (gold), Ag (silver) and S (sulfur) are 0.66%, 0.13 g/t, 2.99 g/t and 4.12% respectively, while the other elements are mainly SiO2 (silicon dioxide), $Al_2O_3$ (aluminum oxide), Fe (ferrum) and $K_2O$ (potassium oxide), with contents of 63.87%, 16.41%, 3.99% and 2.15% respectively. The mineral particles in the ore are analyzed and counted by mineral liberation analyser (MLA), scanning electron microscope (SEM), X-ray diffractometer and X-ray energy spectrometer, and it is determined that gangue minerals are mainly quartz, muscovite, kaolinite, pyrophyllite and pyrite, etc. Main copper minerals are blue chalcocite/chalcocite and bornite, with the contents of 0.44% and 0.38% respectively, followed by chalcopyrite, tennantite and enargite, with the contents of 0.09%, 0.04% and 0.04% respectively, and covellite and antimony tetrahedrite are rare. The sulfur minerals include metal minerals and sulfate minerals. Besides copper minerals, the metal minerals of sulfur also include pyrite with a content of 7.07%, and a small amount of pyrrhotite, galena, sphalerite and molybdenite. Sulfate minerals are mainly alunite with a content of 1.17%, and a small amount of gypsum and barite.

phenyl selenium chloride (structural formula $C_6H_5SeCl$), phenylselenol (structural formula $C_6H_5SeH$) and selenophene (structural formula $C_4H_4Se$) are used as collectors, where a flotation process includes following conditions:

(1) a grinding fineness is-200 mesh, a content is 65%, a pH regulator is lime, and a pulp conditioning time is 3 minutes;

(2) methyl isobutyl carbinol as foaming agent is added in a dosage of 20 g/t, and pulp conditioning is carried out for 2 minutes;

(3) the collectors are added, and pulp conditioning is carried out for 2 minutes;

(4) roughing duration is 3 minutes.

With the best conventional collector O-isobutyl-N-ethoxycarbonyl thiocarbamate (structural formula $C_2H_5OOCNC(SH)O$—$C_4H_9$), a grade of roughing copper is 6.03% and a recovery rate is 87.74%.

When the phenyl selenium chloride (structural formula $C_6H_5SeCl$) is used as the collector, with optimum dosage of 30 g/t, a roughing copper grade is 6.95% and a recovery rate is 89.04% at pH of 8.27. When the phenylselenol (structural formula $C_6H_5SeH$) is used as the collector, with optimum dosage of 30 g/t, a roughing copper grade is 6.76% and a copper recovery rate is 89.15% at pH of 8.27. The flotation effect of these two organic compounds with selenium atom as functional group and containing single selenium atom as the collectors is better than that of the conventional collector, and the grade and recovery rate are higher than those of the conventional collector, showing better selectivity.

When the selenophene (structural $C_4H_4Se$) is used as the collector, with optimum dosage of 300 g/t, a roughing grade of copper is 5.20% and a recovery rate of copper is 77.24% at pH of 8.27. The flotation effect of this organic compound with selenium atom as functional group and containing single selenium atom as the collector is basically the same as that of conventional collector, and this organic compound obtains a better copper flotation index.

Embodiment 2

This embodiment is an application example of the organic compound with selenium atoms as functional groups and containing multiple selenium atoms, including:

the same raw materials as those in embodiment 1.

Dibenzyl diselenide (structural formula $C_6H_5Se2C_6H_5$) and dimethyl diselenide (structural formula $CH_3Se_2CH_3$) are used as collectors, where the flotation process includes following conditions:
(1) the grinding fineness is-200 mesh, the content is 65%, the pH regulator is lime, and the pulp conditioning time is 3 minutes;
(2) the methyl isobutyl carbinol as foaming agent is added in a dosage of 20 g/t, and pulp conditioning is carried out for 2 minutes;
(3) the collectors are added, and pulp conditioning is carried out for 2 minutes;
(4) roughing duration is 3 minutes.

With the best conventional collector O-isobutyl-N-ethoxycarbonyl thiocarbamate (structural formula $C_2H_5OOCNC(SH)O—C_4H_9$), the grade of roughing copper is 6.03% and the recovery rate is 87.74%.

When the dibenzyl diselenide (structural formula $C_6H_5Se_2C_6H_5$) is used as the collector, with optimum dosage of 30 g/t, the roughing copper grade is 6.03% and the recovery rate is 89.14% at pH 8.27. The flotation effect of this organic compound with selenium atoms as functional groups and containing multiple selenium atoms as collector is better than that of conventional collectors, and the grade and recovery rate are higher than those of conventional collectors, showing better selectivity.

When the dimethyl diselenide (structural formula $CH_3Se_2CH_3$) is used as the collector, with optimum dosage of 30 g/t, the copper grade is 6.56% and the copper recovery rate is 85.81% at pH 8.27. The flotation effect of this organic compound with selenium atoms as functional groups and containing multiple selenium atoms as collector is basically the same as that of the conventional collector, and this organic compound obtains a better copper flotation index.

Embodiment 3

This embodiment is an application example of the organic compound containing various structures composed of selenium atom and nitrogen, oxygen, phosphorus, sulfur and carbon as collectors for copper ore flotation, including:
the same raw materials as those in embodiment 1.
Triphenylphosphine selenide (structural formula $(C_6H_5)_3PSe$) is adopted as a collector, where the flotation process includes following conditions:
(1) the grinding fineness is-200 mesh, the content is 65%, the pH regulator is lime, and the pulp conditioning time is 3 minutes;
(2) the methyl isobutyl carbinol as foaming agent is added in a dosage of 20 g/t, and pulp conditioning is carried out for 2 minutes;
(3) the collector is added and pulp conditioning is carried out for 2 minutes;
(4) roughing duration is 3 minutes.

With the best conventional collector O-isobutyl-N-ethoxycarbonyl thiocarbamate (structural formula $C_2H_5OOCNC(SH)O—C_4H_9$), the grade of roughing copper is 6.03% and the recovery rate is 87.74%.

When the triphenylphosphine selenide (structural formula $(C_6H_5)_3PSe$) is used as the collector, with optimum dosage of 200 g/t, the grade of roughed copper is 6.94% and the recovery rate of copper is 84.47% at pH of 8.27. The flotation effect of this organic compound containing selenium atoms combined with phosphorus atoms is basically the same as that of conventional collectors, and this organic compound obtains a better copper flotation index.

Embodiment 4

This embodiment is another application example of the organic compound with various structures composed of selenium atoms and nitrogen, oxygen, phosphorus, sulfur and carbon as copper ore flotation collectors, including:
the same raw materials as those in embodiment 1.
2,1,3-benzoselenediazole (structural formula $C_4H_4C_2N_2Se$) is adopted as a collector where the flotation process includes following conditions:
(1) the grinding fineness is –200 mesh, the content is 65%, the pH regulator is lime, and the pulp conditioning time is 3 minutes;
(2) the methyl isobutyl carbinol as foaming agent is added in a dosage of 20 g/t, and pulp conditioning is carried out for 2 minutes;
(3) the collector is added, and pulp conditioning is carried out for 2 minutes;
(4) roughing duration is 3 minutes.

With the best conventional collector O-isobutyl-N-ethoxycarbonyl thiocarbamate (structural formula $C_2H_5OOCNC(SH)O—C_4H_9$), the grade of roughing copper is 6.03% and the recovery rate is 87.74%.

When the 2,1,3-benzoselenediazole (structural formula $C_4H_4C_2N_2Se$) is used as the collector, with optimum dosage of 30 g/t, the roughing grade of copper is 6.61% and the recovery rate of copper is 80.59% at pH of 8.27. The flotation effect of this organic compound containing selenium atom combined with nitrogen atoms is basically the same as that of conventional collectors, and this organic compound obtains a better copper flotation index.

What is claimed is:

1. An application of a class of selenium-containing organic compounds in copper sulfide flotation collectors, wherein the selenium-containing organic compounds comprise organic compounds with selenium atoms as functional groups and containing single selenium atom or multiple selenium atoms and organic compound containing selenium atoms combined with nitrogen, oxygen, phosphorus, sulfur and carbon, wherein the selenium-containing organic compounds comprise at least one of selenophene, phenylselenol, diselenide, selenomethyl ester, carbonyl selenomethyl ester and oxycarbonyl selenomethyl ester, selenourea, selenium nitrogen, selenoxanthonic acid, selenoxanthate, selenophosphoric acid, selenium phosphate ester, triphenylphosphine selenide, or benzoselenediazole molecules as copper collectors, comprising:
grinding copper sulfide-containing ore to a fineness of 200 mesh with 65% passing rate to yield a screened copper sulfide-containing ore, followed by pulp conditioning of the screened copper sulfide-containing ore with lime as a pH regulator for 3 minutes;
adding a foaming agent to the pulp and conditioning for 2 minutes;
adding the selenium-containing organic compounds as a collector to the pulp and conditioning for 2 minutes; and
performing flotation to recover copper sulfide minerals.

2. The application of a class of selenium-containing organic compounds in copper sulfide flotation collectors according to claim 1, wherein molecular structures of the organic compounds with selenium atoms as functional groups and containing single selenium atom or multiple selenium atoms as the copper sulfide flotation collectors are as follows:

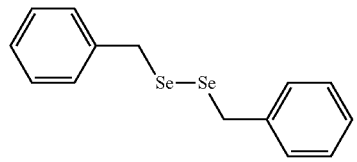

dibenzyl diselenide

dimethyl diselenide

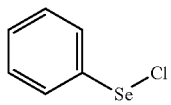

phenyl selenium chloride

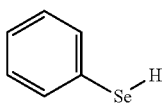

phenylselenol

selenophene

3. The application of a class of selenium-containing organic compounds in copper sulfide flotation collectors according to claim 1, wherein molecular structures of the organic compound containing selenium atoms combined with nitrogen, oxygen, phosphorus, sulfur and carbon are as follows:

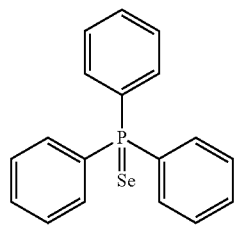 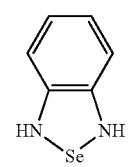

triphenylphosphine selenide    2,1,3-benzoselenediazole

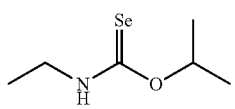

isopropyl ethyl selenomethyl ester    isobutyl ethyl selenomethyl ester

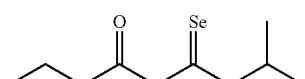

ethyl isopropyl selenoate formate

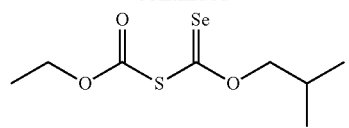

ethyl isobutyl selenoate formate

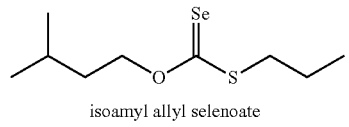

isoamyl allyl selenoate

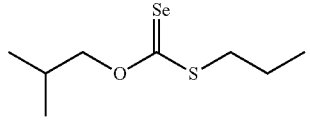

isobutyl allyl selenoate

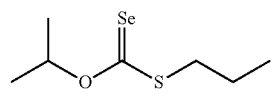

isopropyl allyl selenoate

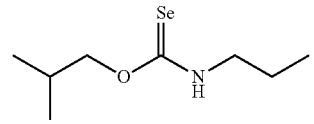

O-isobutyl-N-allyl selenoamine ispropyl selenoate

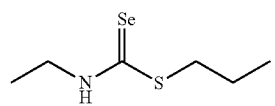

ethyl-N-propylene ester

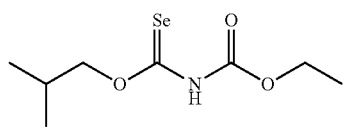

O-isobutyl-N-ethoxycarbonyl selenomethyl ester

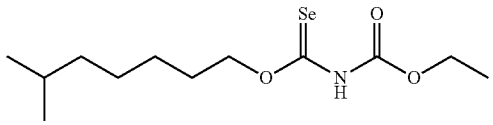

O-isooctyl-N-ethoxycarbonyl selenomethyl ester

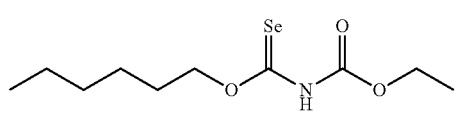

hexoxycarbonyl selenomethyl ester

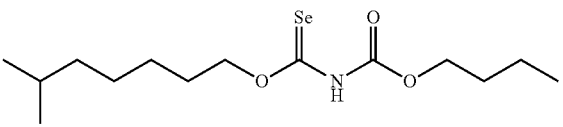

O-isooctyl-N-n-butoxycarbonyl selenomethyl ester

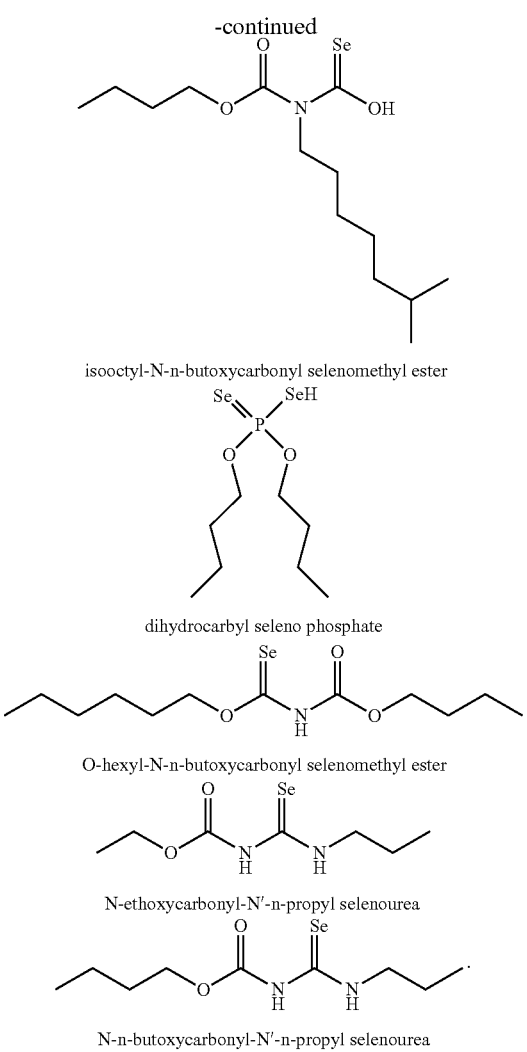

isooctyl-N-n-butoxycarbonyl selenomethyl ester dihydrocarbyl seleno phosphate

O-hexyl-N-n-butoxycarbonyl selenomethyl ester

N-ethoxycarbonyl-N'-n-propyl selenourea

N-n-butoxycarbonyl-N'-n-propyl selenourea

4. The application of a class of selenium-containing organic compounds in copper sulfide flotation collectors according to claim 2, wherein using the dibenzyl diselenide as the collector comprises following steps:
dissolving 0.5%-5% of the dibenzyl diselenide in 95%-99.5% of dichloromethane according to percentage by mass, and stirring for 5 minutes to completely dissolve the dibenzyl diselenide.

5. The application of a class of selenium-containing organic compounds in copper sulfide flotation collectors according to claim 2, wherein using the phenyl selenium chloride as the collector comprises following steps:
dissolving 0.5%-5% of the phenyl selenium chloride in 95%-99.5% of dichloromethane according to percentage by mass, and stirring for 5 minutes to completely dissolve the phenyl selenium chloride.

6. The application of a class of selenium-containing organic compounds in copper sulfide flotation collectors according to claim 2, wherein using the phenylselenol as the collector comprises following steps:
dissolving 0.5%-5% of the phenylselenol in 95%-99.5% of dichloromethane according to percentage by mass, and stirring for 5 minutes to completely dissolve the phenylselenol.

7. The application of a class of selenium-containing organic compounds in copper sulfide flotation collectors according to claim 2, wherein using the dimethyl diselenide as the collector comprises following steps:
dissolving 0.5%-5% of the dimethyl diselenide in 95%-99.5% of dichloromethane according to percentage by mass, and stirring for 5 minutes to completely dissolve the dimethyl diselenide.

8. The application of a class of selenium-containing organic compounds in copper sulfide flotation collectors according to claim 2, wherein using the selenophene as the collector comprises following steps:
dissolving 0.5%-5% of the selenophene in 95%-99.5% of dichloromethane according to percentage by mass, and stirring for 5 minutes to completely dissolve the selenophene.

9. The application of a class of selenium-containing organic compounds in copper sulfide flotation collectors according to claim 3, wherein using the triphenylphosphine selenide as the collector comprises following steps:
dissolving 0.5%-5% of the triphenylphosphine selenide in 95%-99.5% of dichloromethane according to percentage by mass, and stirring for 5 minutes to completely dissolve the triphenylphosphine selenide.

10. The application of a class of selenium-containing organic compounds in copper sulfide flotation collectors according to claim 3, wherein using the 2,1,3-benzoselenediazole as the collector comprises following steps:
dissolving 0.5%-5% of the 2,1,3-benzoselenediazole in 95%-99.5% of dichloromethane according to percentage by mass, and stirring for 5 minutes to completely dissolve the 2,1,3-benzoselenediazole.

\* \* \* \* \*